Aug. 16, 1932.  L. M. DIETERICH  1,871,782
POWER TRANSMISSION MEANS
Filed March 25, 1925
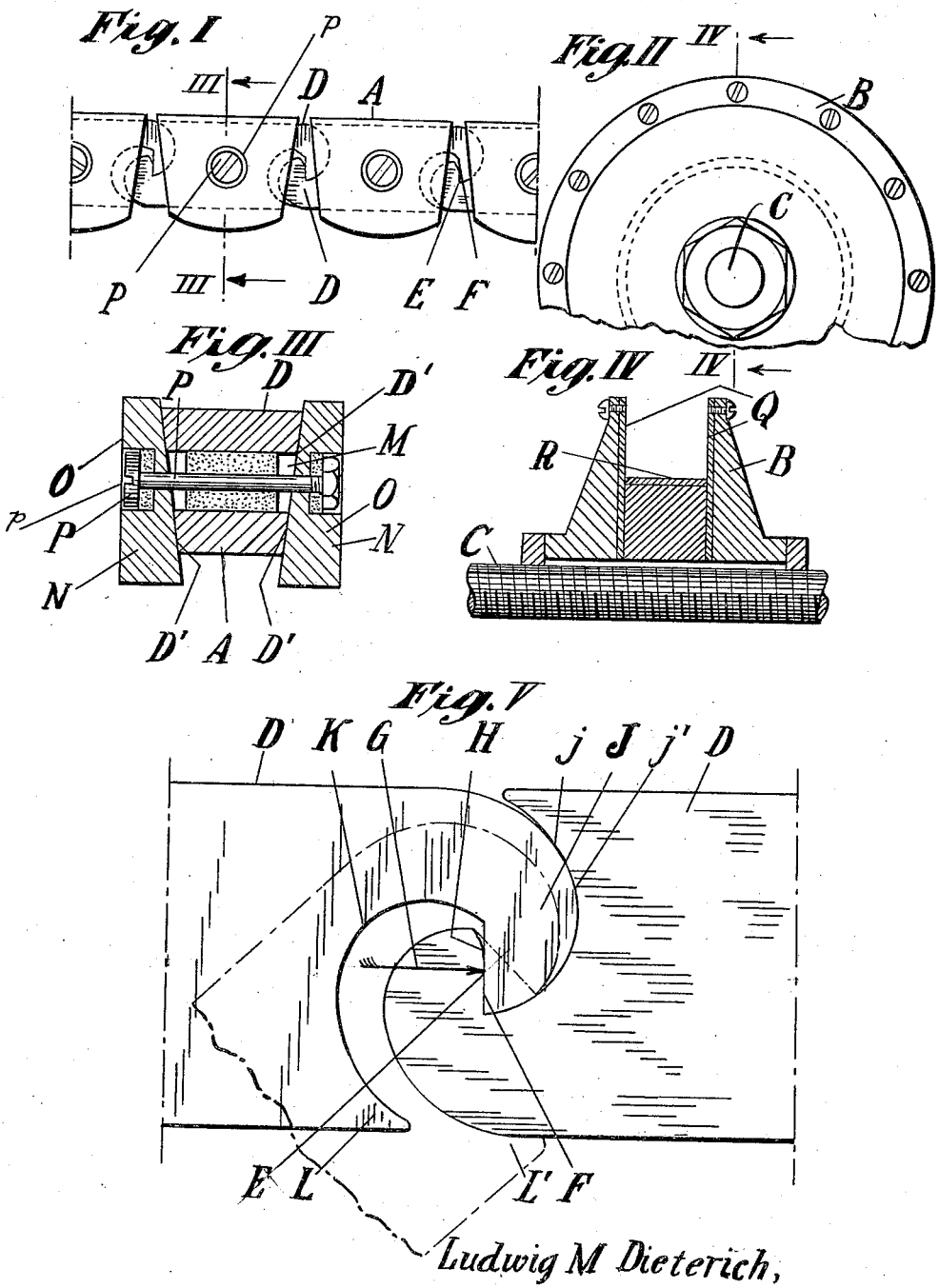
Ludwig M Dieterich,
INVENTOR
BY Robert S. Blair
ATTORNEY Patented Aug. 16, 1932

1,871,782

UNITED STATES PATENT OFFICE

LUDWIG M. DIETERICH, OF NEW BRUNSWICK, NEW JERSEY

POWER TRANSMISSION MEANS

Application filed March 25, 1925. Serial No. 18,139.

This invention relates to power transmission means, which for example involve the driving of one shaft from another parallel shaft where heretofore it has been most usual to employ a chain with sprockets or gearing, in order to obtain a positive drive in cases where a belt or rope drive do not for various reasons satisfy the conditions.

More particularly, my invention provides means to displace a chain and its sprockets, gearing, belts, or the like, but assures a positive transmission of power from one element to the other. Besides the positive transmission, the practice of my invention eliminates the use of sprockets or any devices or elements with teeth having a definite pitch that requires registration of transmission members. It is well known that chains and sprockets require for good operation a very accurate cooperation of pitch which, however, is subject to variations after continued use, involving the wear of links and the wear of teeth, so that the aim to provide the most perfect running, under a heavy load or high speed, has involved exhaustive study and great detailed refining in design and manufacture of pitch chains, etc., in order to approach perfect operation. Even so, the development of chains has resulted in securing an approach to a theoretically right operation, only at the beginning or during a very limited period of service, after which wear or distortion will cause a falling off of the correct conditions and a gradual increase of loss of power and rapid cumulative wear, and accidental or ultimate break-down.

My invention provides a transmission from shaft to shaft, or between other members, in which no tooth or pitch engagement is involved, but in which the transmitting element in the form herein particularly described, positively engages the driven member in the form of an opposed-wall sheave, holding the transmission member positively in engagement during the period of power transmission, but with continuous, instant and automatic release after the phase of engagement during which power transmission is effective.

The invention accordingly consists in the features of construction, combinations of elements, and arrangements of parts as will be exemplified in the structure to be hereinafter described and the scope of the application of which will be indicated in the following claims.

While my invention may be variously employed, and its construction may be modified in many ways, I have herein described a particular embodiment, reference being made to the accompanying drawing in which:

Fig. I is a side elevation of a section of the transmitting member.

Fig. II is a side elevation, fragmentary, of the driven or driving member.

Fig. III is a cross-section of the transmitting member.

Fig. IV is a cross-section on the axis of the driving or driven member.

Fig. V is an elevation, on a larger scale, of the engaging ends of the links in the transmitting member.

In the drawing A is the transmission member, B is the driven or driving member shown in the form of a parallel grooved sheave, carried on a shaft C.

The transmission member or device A consists of blocks D D the adjacent ends of which are formed into transverse bearing faces E and F on claw or hook ends of the respective blocks D. The bearing face F is a plain surface at right angles to the center line of the transmission member or "chain" transverse to the plane of movement and the complementary bearing face E has a portion parallel to and engaging the face F but at a point indicated by the arrow G the surface is curved away from the complementary face F, this curved surface H being such that upon the articulation of the link members the pitch distance will maintain a predetermined relation to the distance between the centers of the links. The linked member being constructed to bend principally in one direction from its line of centers, the overhanging claw end J is made of a sufficient section for the desired strength and its outer surface $j$ is so curved that it will move into and out of engagement with the surface J' of the recess in the complementary link end, without interference.

On the other hand the reentrant surface K of the block end is so undercut as to provide ample clearance to permit the desired latitude of articulation around the claw end G,—such movement being indicated in the dotted lines showing the position in the maximum relative deflection of the link ends, in which case the toe L of one block end reaches the limiting position L' shown in the dotted lines, with the least displacement of metal in the block and thereby retaining an ample section of metal for the desired strength of the linkage.

These blocks D have a transverse aperture M and their side walls D' D' converge at a predetermined angle which is settled by the characteristics of the surface for which the linkage is desired, and involves the question of coefficient of friction and the critical or locking angle for the particular surfaces and metals or other material involved; as well as the questions of range of power and speed.

On both sides of this tapered block D plates N N are fastened with complementary tapered faces engaging the block but with outer surfaces O O substantially parallel.

These lateral plates N N extend below the bottom of the block and may extend above and are held in predetermined position with respect to the block by means of pin P, the head and nut of which are countersunk into the plates as shown at p, and underneath the head and nut of the pin P is placed an elastic washer such as cork, or the like. The pin P is held in the large aperture M in the block D by means of an elastic ferrule of cork or by other suitably yielding means.

It will be thus seen that the transmission device or tension member, in the form herein shown, is a uniform-link chain having claw or hook ends with bearing surfaces transverse to the plane of movement of the chain, permitting the flexing of the chain to the curvature of the pulley or sheave. The chain, however, carries with it lateral plates so arranged that they progressively provide contact with the oppositely disposed side surfaces of the grooves in the sheave. These lateral plates constitute progressively clutch plates in a form that will lock to parallel faces and will also lock to substantially parallel faces within the limits of the critical angle depending upon the coefficient of friction of the surfaces used in each embodiment.

The links of the chain and the side plates are so fashioned as to permit a slight relative movement thereof in a direction radially of the sheave as the chain rides into the groove, and their interconnection in the form shown involves wedge surfaces within suitable limits of angularity, so that the driving tension will cause a lateral pressure on the side plates which locks the side plates in contact with the surfaces of the groove and likewise the block is locked to the side plates. The construction permits a predetermined angularity of wedge surfaces to suit the coefficient of friction involved, and to suit the power and speed for which the transmission is designed, in order to secure a positive clutching of the transmission member with the sheave throughout substantially all of the semi or driving circumference of the sheave. From the point of take-on or where the chain rides into the groove, the wedge action automatically effects the clutching—and this takes place within a very small angular movement of the sheave, varying with the conditions of speed and power, and suitably designed with respect to the mass of the transmission member.

With a number of the links and side plates clutched in the groove the full load is transmitted to the sheave or vice versa, and as the plates and links approach the point of departure of the transmission member from the sheave they are gradually relieved of their tension, and the slack side of the chain finally assures a definite release of the forces causing the clutching and, therefore, automatically relieves the wedges and progressively releases each clutch automatically from the sheave.

The substantial parallelity of the outer sides of the respective plates assures a locking of the surfaces in the groove due to the radially inward strain on the block acting on the single surface of the plate, while the greater angularity of the block—a double angularity—between the two plates, permits the necessary frictional conditions for sliding into action, and also permits and assures the release from between the two plates in order to assure the automatic disengaging of the chain from the sheave.

In particular it is desirable that the frictional engagement of the block and plate surfaces be such as to assure easy movement and certain release. The metal parts of the transmission member or device lend themselves to uniform and accurate production of the desired conditions. The friction between the outer surfaces of plates and the sides of the sheave groove should be greater in order to secure the initial retardation of the plates, that is, their movement with the sheave, so that the force resulting from the tension will dependably actuate the wedging and, therefore, the positive clutching. Accordingly it is preferred to face the grooves with a lining of fibre, or any suitable material used for durability, and other qualifications and particularly for a desired increased friction. That in practical operation assures the lateral friction, with a predetermined surface contact of the plates, so that the chain riding around the sheave will exert the necessary radial force to properly effect the wedging and the lateral clutching. While this may still involve a chain clearance preventing a firm lateral surface contact initially, the necessary "grip" is furthermore assured by a suitable lining or surfacing R on the bottom of the groove which engages the inner edges of the side plates.

This initial friction or resistance need only be such as to counteract the spring or elasticity in the cork ferrule in the aperture M. Other spring devices may be embodied such as coil springs, yieldingly holding the plates together and yieldingly holding them with respect to their sliding on the sides of the block,—the different duty for which each chain is intended serving to generally determine the degree of elasticity and, therefore, the most suitable character of the elastic or yielding means in this part of the structure.

For example satisfactory operation results from the use of a bronze block with steel side plates, substantially as shown in the drawing in which the lateral pressure of the side plates is effected by a wedge angle of approximately 12½ degrees, and in this the release angle of the block being 25 degrees between the two walls of the side plates, the necessary locking and also the ready release is assured. In such case fibre side walls with a groove having parallel sides operates perfectly, with a transmission member running on a sheave with a linear speed of 250 to 500 feet. The side plates being about an inch high and averaging an inch long, riding on a groove base about six inches in diameter, and with a clearance at rest of about 2/100 to 3/100 of an inch between the transmission member and the groove walls.

As mentioned earlier herein, as the link members swing relative to one another about their hooked end connections the pitch distance maintains a predetermined relation to the distance between the link centers. It may be here pointed out that the relation desired to be maintained between these two values is such that the chain will not become too slack as the wedge-shaped blocks slide inwardly relative to the plates. This action of the link members of course reduces the size of the pitch circle of the chain; to counteract this condition the curved surfaces H of the links are shaped so that the distance between link centers increases commensurately with the decrease in size of the pitch circle.

While in Fig. V there is shown in detail the particular form of link or block interconnection, various modifications may be made, and in particular, with the form of connection shown herein or with others, it is an important feature of my invention to provide for a contact curvature at the hooked link ends, or other connection between the links, which varies the distance between the centers of the links in a predetermined manner with respect to the theoretical radial movement of the plates relative to the blocks or wedges during the momentary going-into-action of each wedge, as referred to above. Various forms of links and blocks may be used and the arrangement of surfaces and their relative sizes may be varied to suit the particular conditions of each embodiment. Link-and-block chains, may be used with suitable modifications to provide for the clutch plates and the wedge action; and numerous other changes of design or variations of dimensions may be made when the essential features of my invention and the combination of elements as above set forth are fully appreciated. Heretofore attempts have been made to drive a V pulley by means of a V-shaped belt, depending upon the friction of the wedge on the inclined surfaces but in such cases the angularity of the pulley groove sides which would afford sufficient friction for practical purposes, also effected a locking preventing a proper release, and this with other impracticable features meant in substance simply an attempt to provide a greater belt surface and contact pressure,—but in no way provided a solution of the problem which is solved by the use of my invention herein described.

Under certain conditions of power and speed, as in the case of driving a countershaft, start involves infinitely different forces than those involved within the range of operation under duty, and the yielding or elastic means of connection between the side plates and the wedge may be quite different for the most perfect operation under average working capacity, than when starting. It may, therefore, be desirable in some cases to provide a rider or idler affording an initial pressure to make the chain take-home at the start. Such and various other details may assist in the practical operation or use of my invention, which, however, is herein fully shown and described as to combination and structure; and as many possible embodiments may be made of the above invention and as many changes might be made in the embodiment above set forth, it is to be understood that all matter hereinbefore set forth is to be interpreted as illustrative and not in a limiting sense.

I claim as my invention:

1. In apparatus of the character described, in combination, a flexible power transmitting member adapted to run between the opposed side walls of the groove of a sheave, said member including a plurality of wedge-shaped blocks, hook-shaped at their respective ends and adapted to be hooked together to swing one with respect to the other about an axis parallel to the axis of the sheave, a pair of side plates for each block and adapted to overlap the interengaged hook-shaped ends of said blocks thereby to prevent lateral displacement of one block with respect to the other, and means mounting said side plates upon the sides of said wedge-shaped blocks and adapted to permit relative sliding movement between said side plates and said wedge-shaped blocks.

2. In apparatus of the character described, in combination, a flexible power transmitting member adapted to run between the opposed side walls of the groove of a sheave, said member including a plurality of wedge-shaped blocks, hook-shaped at their respective ends and adapted to be hooked together to swing one with respect to the other about an axis parallel to the axis of the sheave, a pair of side plates for each block and adapted to overlap the interengaged hook-shaped ends of said blocks thereby to prevent lateral displacement of one block with respect to the other, and means mounting said side plates upon the sides of said wedge-shaped blocks and adapted to permit relative sliding movement therebetween and said wedge-shaped blocks, said interengaged hook-shaped ends of said blocks being provided with contacting surfaces having a shape adapted to change the center distance between adjacent blocks in a predetermined ratio with the relative deflection of the blocks from their line of centers.

3. In apparatus of the character described, in combination, a flexible power transmission member adapted to operate between the side walls of the groove of a sheave, said member including a plurality of inwardly directed wedge-shaped blocks, laterally separable means carried by said flexible member and provided with lateral and outwardly exposed faces for contacting with the walls of said groove, said wedge-shaped blocks of said flexible member being adapted, as said flexible member is urged radially inwardly with respect to said sheave and under driving tension, to laterally separate said means and thereby cause the latter to grip the opposed side walls of said sheave groove, and means interconnecting said blocks and adapted to effect a change in the distance between centers of said blocks substantially commensurately with the change in the length of the pitch circle as said wedge-shaped blocks are urged radially inwardly with respect to said sheave.

4. In apparatus of the character described, in combination, a flexible power transmitting member adapted to operate between the substantially parallel opposed side walls of the groove of a sheave, said member including a plurality of pivotally connected inwardly directed wedge-shaped blocks, a pair of side plates for each of said blocks, each side plate having its outer surface substantially parallel to a side face of the sheave groove and having its inner surface inclined for coaction with its associated wedge-shaped block, and means supporting said side plates with respect to their associated blocks, said wedge-shaped blocks being adapted to move radially inwardly with respect to said side plates as said flexible member is urged radially inwardly with respect to said sheave when under driving tension, and said side plates being adapted by the wedging action of said blocks to be displaced laterally one from the other and into gripping relation with respect to the opposed side walls of the groove of said sheave, said supporting means being arranged to permit said relative movements of said blocks and said plates.

5. In apparatus of the character described, in combination, a flexible power transmitting member adapted to operate between the substantially parallel opposed side walls of the groove of a sheave, said member including a plurality of pivotally connected inwardly directed wedge-shaped blocks, a pair of side plates for each of said blocks, each side plate having its outer surface substantially parallel to a side face of the sheave groove and having its inner surface inclined for coaction with its associated wedge-shaped blocks, and yieldable means acting normally to hold said wedge-shaped block in uppermost position with respect to its side plates and to urge said side plates one toward the other, said wedge-shaped block being adapted to be moved inwardly in a radial direction when said flexible member is urged radially inwardly with respect to said sheave when under driving tension, and said side plates being adapted to be moved laterally away from one another and into gripping relation with the opposed walls of said sheave groove by the wedging action of said block as it moves inwardly.

6. In a power transmission, a sheave having opposed faces, a transmission device adapted to move with said sheave in engagement with said opposed faces and having a plurality of articulated tension members and metal clutching members, wedging parts having inclined surfaces cooperating with said clutching members and actuated by said tension members to force said metal members apart, whereby the clutching members automatically lock the tension members between the opposed faces of the sheave.

7. In apparatus of the character described, in combination, a sheave having the groove therein provided with opposed side faces, a flexible member coacting with said sheave, and means carried by said flexible member and arranged to be laterally separable with respect thereto, said means having outer and laterally exposed side faces for contacting with respective walls of said groove in said sheave and having juxtaposed inner faces outwardly divergent, said flexible member being received between said outwardly divergent inner faces of said means and being movably connected relative thereto to move in the direction of a radius of said sheave, and being thereby adapted to separate said means laterally to grip the walls of said sheave groove, as said flexible member is urged radially inwardly with respect to said sheave under driving tension.

8. In apparatus of the character described, in combination, a sheave the groove of which is provided with exposed side walls, a flexible member coacting therewith and having inwardly directed wedge-shaped portions, and laterally separable means carried by said flexible member and provided with lateral and outwardly exposed faces for contacting with the walls of said groove, and means connecting said laterally separable means to said flexible member to permit relative movement between said wedge-shaped portions and said separable means when said flexible member is under driving tension, said wedge-shaped portions of said flexible member being adapted, as said flexible member is urged radially inwardly with respect to said sheave and under driving tension, to laterally separate said means and thereby cause the latter to grip the opposed walls of said sheave groove.

9. In apparatus of the character described, in combination, a sheave the groove of which is provided with exposed side walls, a flexible member coacting therewith and having inwardly directed wedge-shaped portions, laterally separable means carried by said flexible member and provided with lateral and outwardly exposed faces for contacting with the walls of said groove, said wedge-shaped portions of said flexible member being adapted, as said flexible member is urged radially inwardly with respect to said sheave and under driving tension, to laterally separate said means and thereby cause the latter to grip the opposed walls of said sheave groove, and yieldable means for withdrawing said wedge-shaped portions with respect to said laterally separable means as said wedge-shaped portions with coacting laterally separable means ride out of the groove in said sheave.

10. In apparatus of the character described, in combination, a flexible member adapted to run between the opposed side walls of the groove of a sheave, a plurality of members carried by said flexible member, movably mounted with respect thereto, and adapted to be interposed between the said flexible member and the side walls of said groove in said sheave, and connections between said plurality of members and said flexible member adapted, as said flexible member is by the tension thereof urged radially inwardly in said groove, to be urged laterally into gripping relation with respect to the side walls of the groove in said sheave, said connections including yielding means opposing movement inwardly of said flexible member and yielding means opposing lateral movement of said plurality of members.

11. In apparatus of the character described, in combination, a flexible member adapted to run between the opposed side walls of the groove of a sheave, a plurality of pairs of members carried by said flexible member but movably with respect thereto and arranged thereon so that a member of each pair contacts with one of the side walls of the groove in said sheave, and wedge-shaped means yieldably mounted on said flexible member and responsive to the movement of said flexible member radially inwardly with respect to said sheave to urge the members of each pair laterally into clutching engagement with the side walls of said groove.

12. In apparatus of the character described, in combination, a flexible power transmitting member adapted to operate between the substantially parallel opposed side walls of the groove of a sheave, said transmitting member including a plurality of pivotally connected inwardly directed wedge-shaped blocks, a pair of side plates for each of said blocks, each of said side plates having its outer surface substantially parallel to a side face of the sheave groove and having its inner face inclined for coaction with the adjacent surface of its associated wedge-shaped block, and yielding means acting normally to hold said wedge-shaped block in uppermost position with respect to its side plates and to urge said side plates one toward the other, said means comprising a clamping means extending through said block from one side plate to the other and embodying resilient means acting between said side plates and said block.

13. In apparatus of the character described, in combination, a flexible power transmission member adapted to operate between the side walls of the groove of a sheave, said member including a plurality of link members each carrying laterally separable means provided with lateral and outwardly exposed faces for contacting with the walls of said groove, means responsive to inward movement of said flexible member in a direction toward the axis of the sheave for separating said laterally separable means, thereby to cause the latter to grip the walls of said groove, and hook-shaped members at the respective ends of said link members adapted to interconnect adjacent link members, said hook-shaped members being provided with interengaging surfaces having a shape adapted to change the center distance between adjacent link members in a predetermined ratio with respect to the relative deflection of the link members from their line of centers.

In testimony whereof, I have signed my name to this specification this 23rd day of March, 1925.

LUDWIG M. DIETERICH.